US009006646B2

(12) United States Patent
Kalinitchenko

(10) Patent No.: US 9,006,646 B2
(45) Date of Patent: Apr. 14, 2015

(54) MASS SPECTROMETRY APPARATUS

(75) Inventor: Iouri Kalinitchenko, Berwick (AU)

(73) Assignee: Analytik Jena AG, Jena (DE)

( * ) Notice: Subject to any disclaimer, the term of this patent is extended or adjusted under 35 U.S.C. 154(b) by 0 days.

(21) Appl. No.: 13/993,709

(22) PCT Filed: Jan. 25, 2012

(86) PCT No.: PCT/AU2012/000064
§ 371 (c)(1),
(2), (4) Date: Jun. 13, 2013

(87) PCT Pub. No.: WO2012/100299
PCT Pub. Date: Aug. 2, 2012

(65) Prior Publication Data

US 2013/0292565 A1 Nov. 7, 2013

(30) Foreign Application Priority Data

Jan. 25, 2011 (AU) ................................ 2011900236

(51) Int. Cl.
*B01D 59/44* (2006.01)
*H01J 49/00* (2006.01)
*H01J 49/10* (2006.01)

(52) U.S. Cl.
CPC ........... *H01J 49/0013* (2013.01); *H01J 49/105* (2013.01)

(58) Field of Classification Search
None
See application file for complete search history.

(56) References Cited

U.S. PATENT DOCUMENTS

| | | | | |
|---|---|---|---|---|
| 5,204,530 | A * | 4/1993 | Chastagner .................. | 250/281 |
| 6,586,730 | B1 * | 7/2003 | Kamimura et al. ........... | 250/288 |
| 2003/0155496 | A1 * | 8/2003 | Kalinitchenko .............. | 250/281 |
| 2004/0031917 | A1 * | 2/2004 | Hager .......................... | 250/282 |
| 2004/0217279 | A1 * | 11/2004 | Hobbs et al. ................. | 250/288 |
| 2004/0222369 | A1 * | 11/2004 | Makarov et al. .............. | 250/281 |
| 2005/0258364 | A1 * | 11/2005 | Whitehouse et al. ......... | 250/292 |
| 2006/0076482 | A1 * | 4/2006 | Hobbs et al. ................. | 250/287 |
| 2006/0284080 | A1 * | 12/2006 | Makarov et al. .............. | 250/290 |
| 2007/0187585 | A1 * | 8/2007 | Verentchikov ................ | 250/287 |
| 2007/0194223 | A1 * | 8/2007 | Sato et al. ..................... | 250/287 |
| 2009/0218486 | A1 * | 9/2009 | Whitehouse et al. ......... | 250/288 |
| 2013/0292565 | A1 * | 11/2013 | Kalinitchenko .............. | 250/288 |

FOREIGN PATENT DOCUMENTS

WO WO 2012100299 A1 * 8/2012

OTHER PUBLICATIONS

International Search Report for PCT/AU2012/000064 dated Mar. 9, 2012.

International Preliminary Report on Patentability for International Patent Application No. PCT/AU2012/000064, mailed Aug. 8, 2013.

* cited by examiner

*Primary Examiner* — Andrew Smyth

(74) *Attorney, Agent, or Firm* — Robic, LLP

(57) ABSTRACT

There is provided a mass spectrometry apparatus comprising: an ion source arranged in a substantially horizontal orientation and from which a quantity of ions may be sourced, an ion filter device arranged for receiving a stream of ions for filtering thereof; and, an ion guide arranged so as to guide ions sourced from the ion source toward the ion filter device. The ion source and the ion filter device are arranged relative to one another so that the profile of the apparatus is reduced so as to minimize the effective footprint of the apparatus.

26 Claims, 8 Drawing Sheets

MASS SPECTROMETRY APPARATUS

FIELD OF THE INVENTION

The present invention concerns improvements in or relating to mass spectrometry. More particularly, the invention relates to improvements to apparatus for mass spectrometry including, non-exhaustively, inductively coupled plasma mass spectrometers.

BACKGROUND OF THE INVENTION

In this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

Mass spectrometers are specialist devices used to measure the mass-to-charge ratio of charged particles for the determination of the elemental composition of a sample or molecule. There are many different techniques used for such purposes. One form of mass spectrometry involves the use of an inductively coupled plasma (ICP) torch for generating a plasma field within which a test sample is introduced. In this form, the plasma vaporises and ionizes the sample so that ions from the sample can be extracted and introduced to a mass spectrometer.

Mass spectrometers also include a mass filter or mass analyzer into which the ions are directed by ion optic lenses. Mass analyzers serve to filter ions based on their mass to charge ratio. Typically, mass analysers comprise a number of poles. For example, quadrupole based mass analysers have four parallel rods.

Once the ions have traveled the length of the mass analyzer they are received by a detector unit for analysis.

Typical arrangements of such mass spectrometers have been found to be problematic in that, due to the geometries of the respective components (notably the respective lengths of the mass analyzer and detector units), conventional mass spectrometry devices tend to be bulky and generally inconvenient when used or stored on conventional laboratory work spaces such as work desk tops or bench tops.

SUMMARY OF THE INVENTION

According to a first principal aspect of the present invention, there is provided a mass spectrometry apparatus comprising:

an ion source arranged in a substantially horizontal orientation and from which a quantity of ions may be sourced;

an ion filter device arranged for receiving a stream of ions for filtering thereof; and, an ion guide arranged so as to guide ions sourced from the ion source toward the ion filter device;

wherein the ion source and the ion filter device are arranged relative to one another so that the profile of the apparatus is reduced so as to minimise the effective footprint of the apparatus.

In one embodiment, the ions from the ion source may be extracted and arranged to flow along a first intended path of travel.

In another embodiment, the ions receivable by the ion filter device are arranged to flow along a second intended path of travel so as to be received by an ion analysis device. The ion guide may therefore be arranged to divert or guide the ions from the first intended path of travel to flow along the second intended path of travel, the arrangement being such that the apparatus has a reduced footprint when supported on a typical supporting surface such as a bench or desk top.

According to a second principal aspect of the present invention there is provided a mass spectrometry apparatus comprising:

an ion source from which a quantity of ions may be sourced for providing a stream of ions moving along a first intended path of travel;

an ion filter device provided for receiving a stream of ions moving along a second intended path of travel for filtering the ion stream prior to analysis by an ion analysis device; and, an ion guide arranged so as to divert ions moving along the first intended path of travel to move along the second intended path of travel;

wherein the first and second intended paths of travel are arranged relative to one another so that the profile of the apparatus in a plane aligned substantially orthogonal to the second intended path of travel is reduced so as to minimise the effective footprint of the apparatus.

According to a third principal aspect of the present invention there is provided a mass spectrometry apparatus comprising:

an ion source from which a quantity of ions may be sourced for providing a stream of ions capable of moving along a first intended path of travel;

an ion filter device provided for receiving a stream of ions moving along a second intended path of travel for filtering the ion stream prior to analysis by an ion analysis device; and, an ion guide arranged so as to divert ions moving along the first intended path of travel to move along the second intended path of travel;

wherein the first and second intended paths of travel are arranged relative to one another so that the profile of the apparatus in a plane aligned substantially horizontally is reduced so as to minimise the effective footprint of the apparatus.

In one embodiment according to this arrangement, the ion source comprises an inductively coupled plasma (ICP) which is aligned so that the first intended path of travel is aligned substantially with a horizontal plane. Accordingly, the profile of the housing may therefore be reduced in the horizontal plane in order to minimise the effective footprint of the housing.

The mass spectrometry apparatus according to the third principal aspect may comprise a housing configured to enclose all relevant internal components. Accordingly, in this embodiment, the first and second intended paths of travel are arranged relative to one another so that the profile of the housing in a plane substantially parallel with the first intended path of travel is reduced so as to minimise the effective footprint of the housing.

Embodiments of the first, second and third principal aspects of the invention may be arranged with any one or more of the following features:

In one embodiment, the first and second intended paths of travel are generally linear. The first intended path of travel may be a path having a desired direction within a first plane, and the second intended path of travel may be a path having a desired direction within a second plane.

In one embodiment, the first and second planes are aligned so as to be substantially orthogonal to one another. The first plane may be aligned so as to be substantially parallel with a horizontal plane, and the second plane may be aligned so as to be substantially parallel with a vertical plane.

The ion source may be provided by an inductively coupled plasma. In such embodiments, the inductively coupled plasma is generally orientated in a substantially horizontal plane.

In other embodiments, the ion source may comprise any known apparatus or device capable of providing ions for analysis. Such apparatus or device may include electron impact, microwave plasma, photo plasma, glow discharge, capacitive discharge, electro spray, chemo-ionisation, and/or laser ablation arrangements.

In one embodiment, the distance traveled by ions along the first intended path of travel is substantially smaller than the distance traveled by ions along the second intended path of travel.

The ion analysis device may include a mass spectrometry ion detector unit.

The ion filter device may comprise a mass filter or mass analyzer, such as a quadrupole mass analyzer, arranged to receive a stream of ions from the ion guide for filtering purposes. In such embodiments, the mass analyzer receives ions traveling along the second intended path of travel in the direction of the ion analysis device. Accordingly, the ion filter device may be positioned adjacent the ion analysis device so that ions passing through the ion filter device proceed directly to the ion analysis device or ion detector unit immediately thereafter.

The ion filter device may comprise two or more pole elements such as metallic rods arranged in a spaced apart but parallel relationship with one another. In one embodiment, the mass analyzer is a quadrupole mass analyzer having four spaced apart but parallel metallic rods.

The metallic rods used in the ion filter device may be shaped so as to have a substantially circular or hyperbolic cross section. However, it may be appreciated that the rods may be formed of any cross section shape suitable for operation.

The ion filter device may be arranged so as to be aligned substantially parallel to a vertical plane. In this embodiment, a longitudinal axis of the ion filter device (about which the rods of the ion filter device might be spaced about) is arranged so as to be substantially parallel with a vertical plane.

Typically, ion filter device arrangements are greater in their longitudinal dimension than in their height and width dimension. Therefore, when the ion filter device is aligned in the vertical plane, a substantial saving in space (such as bench space or floor space) can be achieved and the effective footprint of the apparatus may be reduced. Accordingly, users of such equipment may benefit in that less storage space is required and/or more work space is available when the apparatus is stored or supported on a working surface such as a typical laboratory bench/desk top.

The ion guide may comprise any arrangement (such as an ion mirror or an optics lens arrangement) capable of directing, redirecting or diverting (by way of for example deflection and/or reflection) a beam or stream of ions between the first and second intended paths of travel.

In one embodiment, the ion guide comprises an ion optics lens arrangement capable of providing the required deflection and/or reflection of the ion beam (such as between or from the first and second intended paths of travel). Such ion optics devices may include arrangements such as ion mirrors, reflectors, deflectors, quadrupole ion deflectors, electrostatic energy analysers, magnetic ion optics, ion multiple guides, and the like. It will be appreciated that the latter examples are not exhaustive but that any arrangement capable of deflecting a quantity of ions between two non-parallel planes may be employed with embodiments or arrangements of the present invention. For example, the ion guide may comprise an arrangement, or suitable variation thereof, of an ion optics 'Ion Mirror' device as employed in some ICP-MS mass spectrometry devices as described in U.S. Pat. No. 6,614,021 (incorporated herein by reference). Furthermore, having specific regard to ICP-MS, arrangements such as those described in the following U.S. patents may be arranged to work with embodiments of the present invention: U.S. Pat. No. 5,559,337, U.S. Pat. No. 5,773,823, U.S. Pat. No. 5,804,821, U.S. Pat. No. 6,031,379, U.S. Pat. No. 6,815,667, U.S. Pat. No. 6,630,665, U.S. Pat. No. 6,6306,651.

In one embodiment, the ion guide comprises curved elements, such as curved metallic fringing rods, arranged so as to guide or direct the ion stream between the first and second intended paths of travel. The curved elements may be shaped in a manner that is commensurate with a portion or segment of the intended path of the ion stream.

Mass spectrometry apparatus according to the invention may further comprise one or more collisional cells arranged for filtering interfering particles from the ion stream, thereby seeking to improve the signal strength of the ion stream at the ion analysis device or ion detector unit. Any of the arrangements of the mass spectrometry apparatus described herein may include one or more collisional cells.

The or each collisional cell may be arranged so as to accommodate one or more reaction or collision gases such as ammonia, methane, oxygen, nitrogen, argon, neon, krypton, xenon, helium or hydrogen, or mixtures of any two or more of them, for reacting with ions extracted from the plasma. It will be appreciated that the latter examples are by no means exhaustive and that many other gases, or combinations thereof, may be suitable for use in such collisional cells.

The or each collisional cell may be placed at any desired location along the first and/or second intended paths of travel of the ion stream so as to remove unwanted particles from the ion stream.

In one arrangement, at least one collisional cell is placed between the ion source and the ion analysis device.

In a further embodiment, at least one collisional cell is placed between the ion guide and the ion analysis device.

In a further embodiment, at least one collisional cell is placed between the ion guide and the mass analyzer.

In one embodiment, the mass spectrometer may be arranged so that the flow of ions moving along the second intended path of travel, when aligned substantially in a vertical plane, is in a direction substantially downwards relative to the vertical plane (ie. moving with the action of gravity). In an alternative embodiment, the mass spectrometer may be arranged so that the flow of ions moving along the second intended path of travel is substantially upwards relative to the vertical plane (ie. moving against the action of gravity). Thus, when the second intended path of travel is aligned substantially in a vertical plane, the mass spectrometer may be arranged so that the ion stream either flows upwards or downwards relative to the vertical plane. It will be appreciated that in such arrangements, the position of the ion source will be different. For arrangements where the ions flow downwards along the second intended path of travel, the ion source will be positioned above the ion analysis device and preferably located in the upper region of the housing of the apparatus. Furthermore, for arrangements where the ions flow upwards along the second intended path of travel, the ion source will be positioned below the ion analysis device and preferably located in the lower region of the housing of the apparatus.

Mass spectrometry apparatus according to the invention generally comprises a housing configured to enclose all of the internal components of the apparatus such as at least the ion source, ion analysis device and ion guide. Accordingly, in this embodiment, the first and second intended paths of travel are arranged relative to one another so that the profile of the housing in a plane substantially orthogonal to the second intended path of travel is reduced so as to minimise the effective footprint of the housing.

According to a further principal aspect of the present invention, there is provided an inductively coupled plasma mass spectrometry apparatus comprising:

an ion source arranged in a substantially horizontal orientation and from which a quantity of ions may be sourced;

an ion filter device arranged for receiving a stream of ions for filtering thereof; and, an ion guide arranged so as to guide ions sourced from the ion source toward the ion filter device;

wherein the ion source and the ion filter device are arranged relative to one another so that the profile of the apparatus in a plane aligned substantially horizontally is reduced so as to minimise the effective footprint of the apparatus.

According to another principal aspect of the present invention, there is provided an inductively coupled plasma mass spectrometry apparatus comprising:

an ion source arranged in a substantially horizontal orientation and from which a quantity of ions may be sourced;

an ion filter device arranged in a substantially vertical orientation for receiving a stream of ions for filtering thereof; and, an ion guide arranged so as to guide ions sourced from the ion source to move toward the ion filter device;

wherein, the ion source and the ion filter device are arranged relative to one another so that the profile of the apparatus in a plane aligned substantially horizontally is reduced so as to minimise the effective footprint of the apparatus.

According to a further principal aspect of the present invention, there is provided an inductively coupled plasma mass spectrometry apparatus comprising:

an ion source from which a quantity of ions may be sourced for providing a stream of ions moving along a first intended path of travel;

an ion filter device provided for receiving a stream of ions moving along a second intended path of travel for filtering the ion stream prior to analysis by an ion analysis device; and, an ion guide arranged so as to divert ions moving along the first intended path of travel to move along the second intended path of travel;

wherein the first and second intended paths of travel are arranged relative to one another so that the profile of the apparatus in a plane aligned substantially orthogonal to the second intended path of travel is reduced so as to minimise the effective footprint of the apparatus.

In one embodiment, the first intended path of travel is aligned substantially with a horizontal plane and the second intended path of travel is aligned substantially with a vertical plane whereby the stream of ions moving along the second intended path of travel move in a direction substantially upwards relative to the vertical plane.

In another embodiment, the ion guide is an ion mirror.

In a further embodiment, the ion filter device is a quadrupole mass analyzer.

In another embodiment, the apparatus comprises a collisional cell positioned intermediate of the ion guide (for example a ion mirror) and the ion filter device (for example a quadrupole mass analyzer).

According to a further principal aspect of the present invention, there is provided an inductively coupled plasma mass spectrometry apparatus comprising:

an ion source from which a quantity of ions may be sourced for providing a stream of ions moving along a first intended path of travel aligned substantially with a horizontal plane;

a quadrupole mass analyzer for receiving a stream of ions moving along a second intended path of travel for filtering the ion stream prior to analysis by an ion analysis device, the second intended path of travel being aligned substantially with a vertical plane and the stream of ions moving therealong arranged to move in a direction substantially upwards relative to the vertical plane;

an ion mirror arranged so as to divert ions moving along the first intended path of travel to move along the second intended path of travel; and, a collisional cell positioned intermediate of the ion mirror and the quadrupole mass analyzer; and, wherein the first and second intended paths of travel are arranged relative to one another so that the profile of the apparatus in a plane aligned substantially orthogonal to the second intended path of travel is reduced so as to minimise the effective footprint of the apparatus.

According to a further aspect of the present invention, there is provided an inductively coupled plasma mass spectrometry apparatus comprising:

an ion source from which a quantity of ions may be sourced for providing a stream of ions capable of moving along a first intended path of travel;

an ion filter device provided for receiving a stream of ions moving along a second intended path of travel for filtering the ion stream prior to analysis by an ion analysis device; and, an ion guide arranged so as to divert ions moving along the first intended path of travel to move along the second intended path of travel;

wherein the first and second intended paths of travel are arranged relative to one another so that the profile of the apparatus in a plane aligned substantially horizontally is reduced so as to minimise the effective footprint of the apparatus.

It will be appreciated that the above defined inductively coupled plasma mass spectrometry apparatus of the present invention may be arranged with any of the above defined features which may be arranged with any of the first, second or third principal aspects of the invention.

BRIEF DESCRIPTION OF THE DRAWINGS

Embodiments of the invention will now be further explained and illustrated, by way of example only, with reference to any one or more of the accompanying drawings in which.

DETAILED DESCRIPTION

Figure 1:
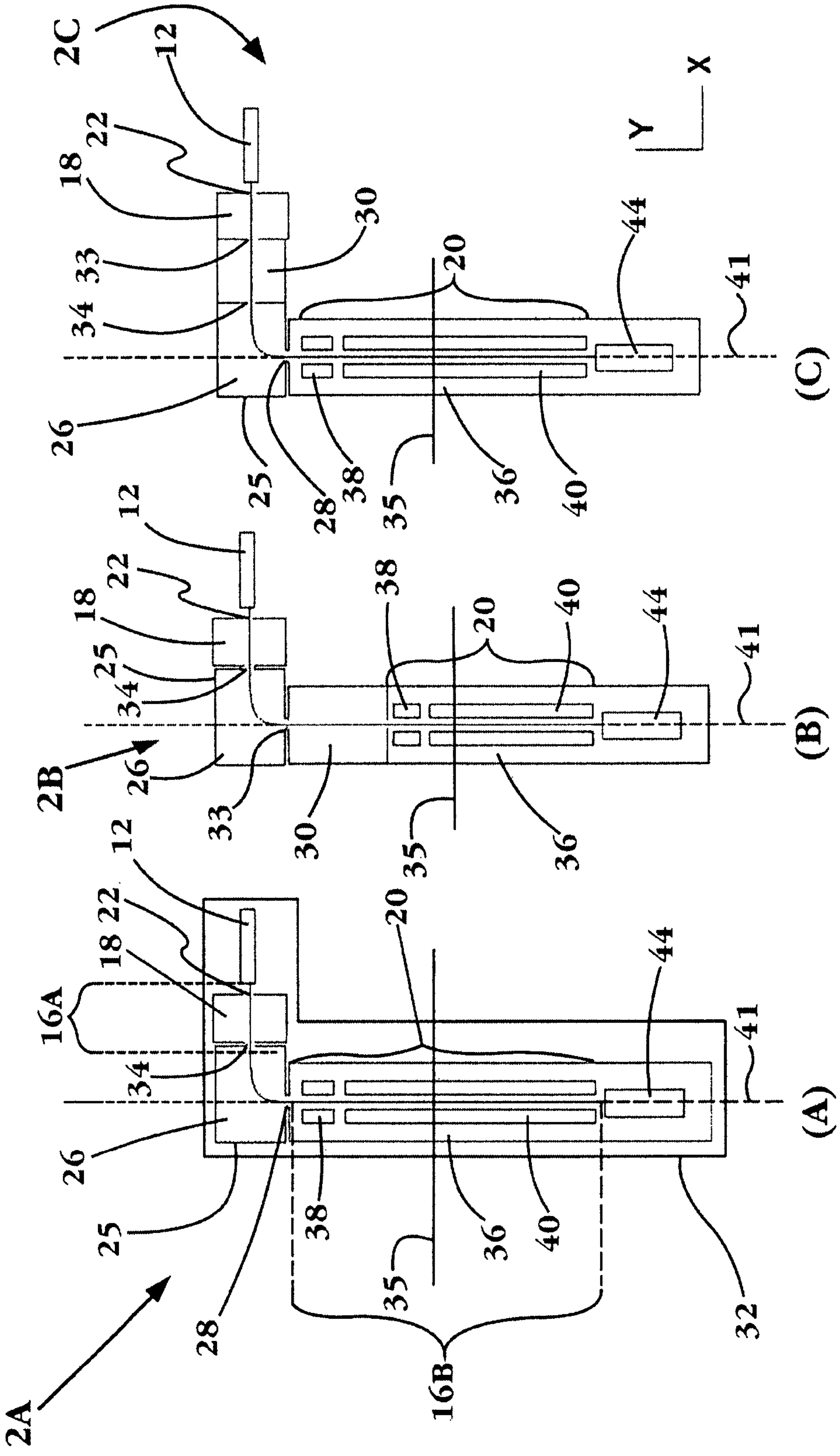
FIG. 1A shows a schematic representation of an inductively coupled plasma mass spectrometry (ICP-MS) apparatus arranged in accordance with one embodiment of the present invention.
FIG. 1B shows a schematic representation of another embodiment of an ICP-MS apparatus arranged in accordance with the present invention.
FIG. 1C shows a schematic representation of a further embodiment of an ICP-MS apparatus arranged in accordance with the present invention.
Figure 2:
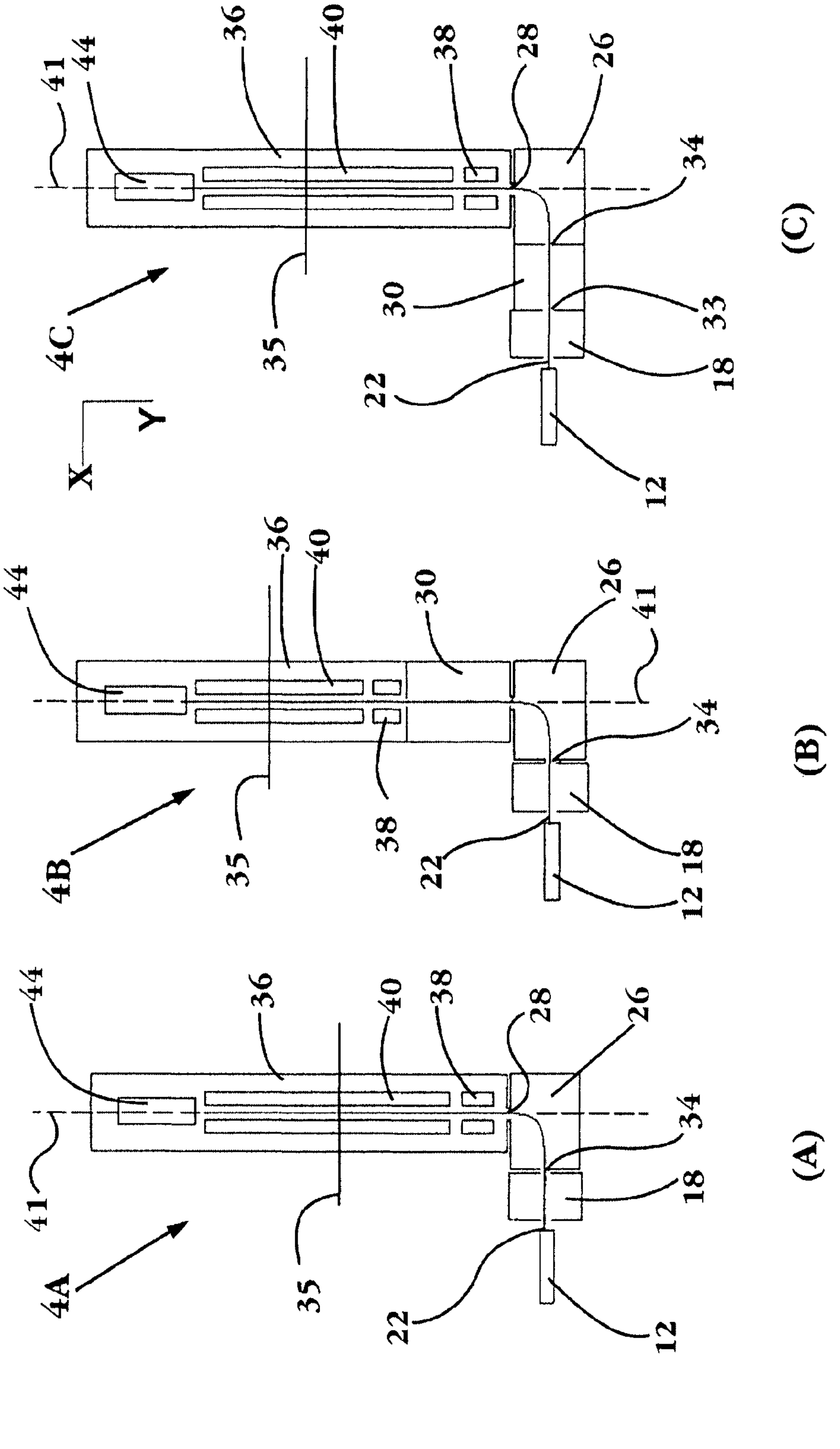
FIG. 2A shows a variation of the embodiment of the ICP-MS apparatus shown in FIG. 1A.
FIG. 2B shows a variation of the embodiment of the ICP-MS apparatus shown in FIG. 1B.
FIG. 2C shows a variation of the embodiment of the ICP-MS apparatus shown in FIG. 1C.
Figure 3:
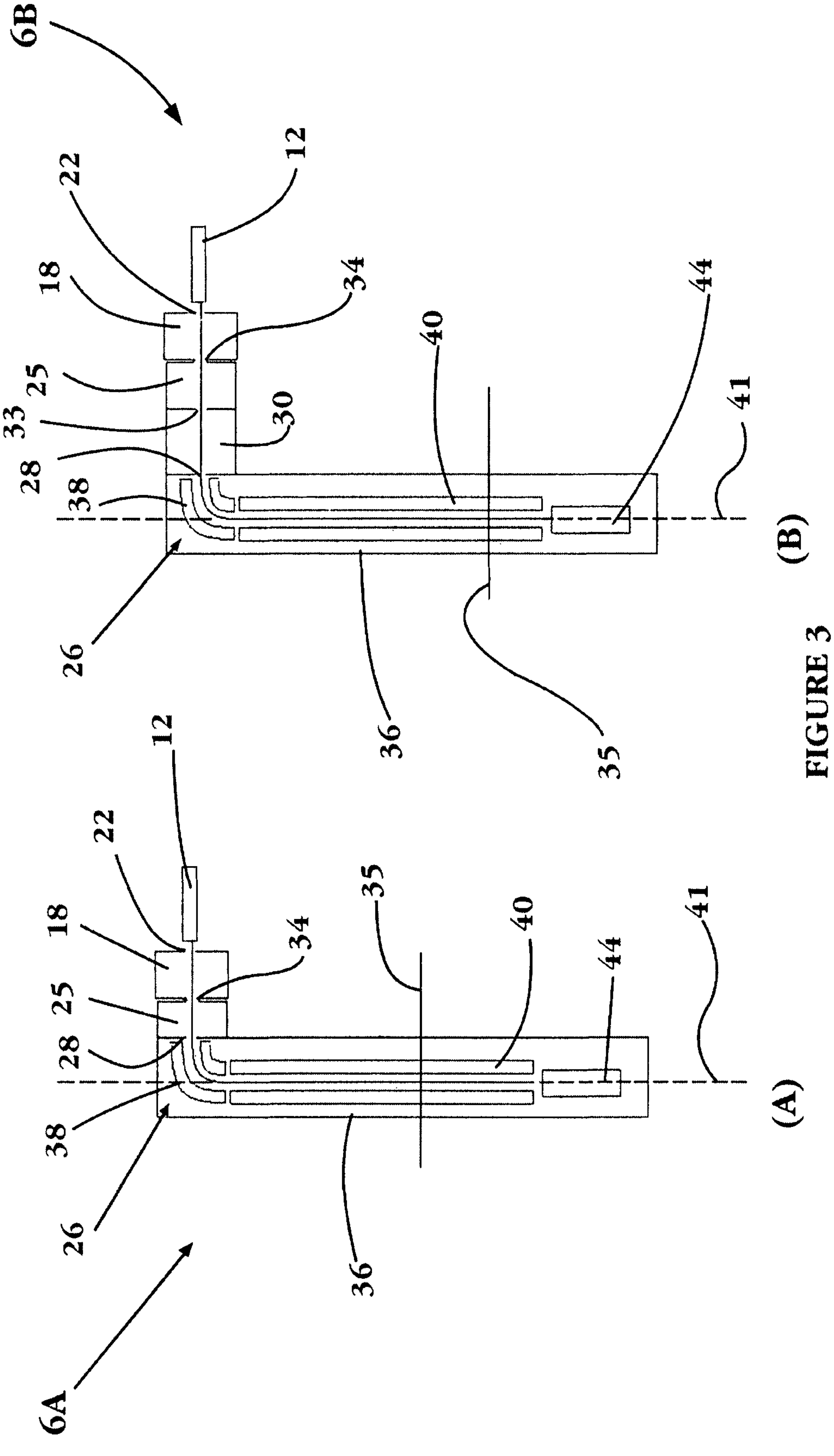
FIG. 3A shows a schematic representation of another embodiment of an ICP-MS apparatus arranged in accordance with the present invention.
FIG. 3B shows a schematic representation of a further embodiment of an ICP-MS apparatus arranged in accordance with the present invention.
Figure 4:
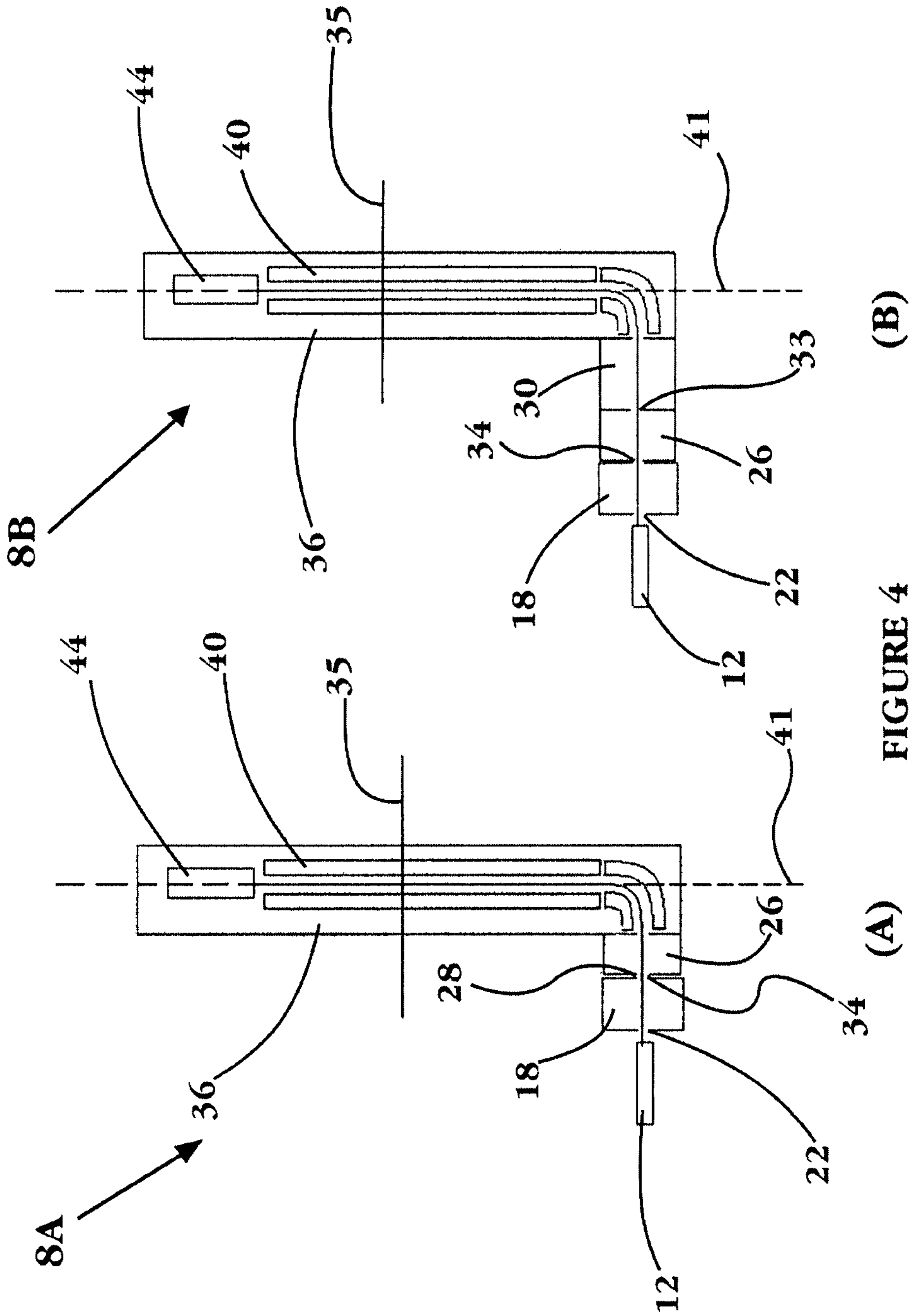
FIG. 4A shows a variation of the embodiment of the ICP-MS apparatus shown in FIG. 3A.
FIG. 4B shows a variation of the embodiment of the ICP-MS apparatus shown in FIG. 3B.

For brevity, several embodiments of a mass spectrometry apparatus, as arranged in accordance with the present invention, will be described with specific regard to inductively coupled mass spectrometry (ICP-MS). However, it will be appreciated that such sampling interface arrangements may be readily applied to any mass spectrometry instrumentation, including those having any type of collision atmosphere (including, but not limited to multi-pole collisional or reaction cells) arrangements used for selective ion particle fragmentation, attenuation, reaction, collision scattering, manipulation, and redistribution with the purpose of mass-spectra modification.

Accordingly, the following mass spectrometry devices may benefit from the principles of the present invention: atmosphere pressure plasma ion source (low pressure or high pressure plasma ion source can be used) mass spectrometry such as ICP-MS, microwave plasma mass spectrometry (MP-MS), glow discharge mass spectrometry (GD-MS) or optical plasma mass spectrometry (for example, laser induced plasma), gas chromotography mass spectrometry (GC-MS), liquid chromotography mass spectrometry (LC-MS), and ion chromotography mass spectrometry (IC-MS), electron ionization (EI), direct analysis in real time (DART), desorption electro-spray (DESI), flowing atmospheric pressure afterglow (FAPA), low temperature plasma (LTP), dielectric barrier discharge (DBD), helium plasma ionization source (HPIS), spheric pressure photo-ionization (DAPPI), and atmospheric description ionization (ADI). The skilled reader will appreciate that the latter list is not intended to be exhaustive, as other developing areas of mass spectrometry may benefit from the principles of the present invention.

By way of brief explanation, in the case of ICP-MS devices, a 'Campargue' type configuration plasma sampling interface is often utilized to provide for the production and transfer of ions from a test sample to a mass spectrometer. An interface of this configuration generally consists of two electrically grounded components: a first component generally referred to as a sampler (or sampler cone), which is placed adjacent the plasma to serve as an inlet for receiving ions produced by the plasma; and a second component commonly known as a skimmer (or skimmer cone), which is positioned downstream of the sampler so that ions pass therethrough en route to the mass spectrometer. The skimmer generally includes an aperture through which the ions pass. The purpose of the sampler and skimmer arrangement is to allow the ions to pass (via respective apertures) into a vacuum environment required for operation by the mass spectrometer. The vacuum is generally created and maintained by a multi-stage pump arrangement in which the first stage attempts to remove most of the gas associated with the plasma. One or more further vacuum stages may be used to further purify the atmosphere prior to the ions reaching the mass spectrometer detector unit. In most systems, an ion optics or extraction lens arrangement is provided and positioned immediately downstream of the skimmer for separating the ions from UV photons, energetic neutrals, and any further solid particles that may be carried into the instrument from the plasma.

With reference to FIG. 1A, there is shown one embodiment of a mass spectrometry apparatus 2A arranged in accordance with the present invention. For consistency, and ease of explanation, the embodiments of the invention shown in the accompanying Figures are configured to work with an ion source which comprises an inductively coupled plasma (ICP). Accordingly, a conventional Campargue sampler arrangement (broadly discussed above) is used as a means of extracting the ions from the ICP ion source. However, it will be appreciated that the principles of the invention described herein, and exemplified by way of example in the Figures, is not to be limited to ICP based devices. Those skilled in the art will appreciate that other forms of mass spectrometry may readily benefit from the core aspects of the present invention described herein. Other ion sources may comprise any known apparatus or device capable of providing ions for mass spectrometry analysis. By way of brief example, such apparatus or devices may include electron impact, microwave plasma, photo plasma, glow discharge, capacitive discharge, electro spray, chemo-ionisation, and laser ablation arrangements.

The mass spectrometer 2A comprises: an ion source 12 from which a quantity of ions may be sourced for providing a stream of ions 22 moving along a first intended path 16A of travel; an ion filter device 20 provided for receiving a stream of ions moving along a second intended path of travel 16B en route to an ion analysis device 44; and, an ion optics unit such as an ion guide 26 arranged so as to divert ions moving along the first intended path of travel 16A to move along the second intended path of travel 16B. The ion source 12 and the ion filter device 20 are arranged relative to one another so that the profile of the mass spectrometer 2A is reduced so as to minimise the effective footprint of the mass spectrometer 2A.

For commercial embodiments, the mass spectrometer 2A comprises a housing 32 within which at least the ion source 12, ion filter device 20 and ion guide 26 are accommodated. As such, by way of the arrangement of the ion source 12 and the ion filter device 20, the profile of the housing in a substantially horizontally aligned plane 35 is reduced so as to minimise the effective footprint of the mass spectrometer 2A on a supporting surface (such as for example surface 52 referred to below). Accordingly, arrangements and embodiments of the present invention shown in FIGS. 1-8 may be advantageous in providing a unique mass spectrometry arrangement having a reduced bench top footprint which may serve to increase, for example, available work space in laboratories and the like where such equipment is typically stored and used.

For the embodiment of the mass spectrometer 2A shown, each of the first 16A and second 16B intended paths of travel are generally linear. The ions are extracted from the ion source 12 and pass through an interface arrangement which comprises a sampler cone and a skimmer cone (both not shown but generally denoted by an interface region 18). In the case of a conventional Campargue sampler arrangement, a quantity of ions is extracted from the ion source 12, and pass through the interface region 18 (sampler and skimmer cones)

along a path in accordance with a first intended path of travel 16A. In the embodiment shown, the first intended path of travel 16A has a general direction which resides within a horizontal plane.

Upon passing through interface region 18, the ions pass through an aperture 34 into an ion optics lens 25. Ion optics lens 25 includes ion guide 26 which serves to divert the ions through an angle of about 90 degrees thereby changing their path of travel from the first intended path of travel 16A to the second intended path of travel 16B. The second intended path of travel 16B has a general desired direction within a vertical plane.

The ions exit ion guide 26 through aperture 28 and pass into ion filter device 20 which comprises a quadrupole mass analyzer 36. In the embodiment shown, quadrupole mass analyzer 36 includes a set of preliminary fringing rods 38 followed by a set of main filter rods 40. It will be readily appreciated by those skilled in the art that the function of quadrupole mass analyzer 36 is to filter the stream of ions of unwanted particles based upon the mass-charge ratio of the target ions in the ion stream. Furthermore, the specific arrangement of quadrupole mass analyzer 36 is not at all crucial to the principle of the invention described herein, and can be configured in any suitable arrangement appropriate to the circumstances at hand.

The skilled person will also appreciate that variations to quadrupole mass analyzer 36 arrangement shown may also be realized. Suitable mass analyzer devices may comprise one or more poles arranged in a spaced apart but parallel relationship with one another. Furthermore, the poles such as metallic rods used in the mass analyzer may be shaped so as to have a substantially circular or hyperbolic cross section. However, in other embodiments the rods may be formed of any cross section shape suitable for operation in a given application.

As shown in the embodiments throughout the Figures, quadrupole mass analyzer 36 is arranged so as to reside substantially in a vertical plane. In this embodiment, a longitudinal axis 41 (or an axis about which the rods of quadrupole mass analyzer 36 are spaced about) of quadrupole mass analyzer 36 is arranged so as to be aligned substantially within, or arranged substantially parallel with, a vertical plane, and substantially concentric with the second intended path of travel 16B of the ions. Typically, quadrupole mass analyzer devices are greater in length in their longitudinal dimension (lengthwise) than in their transverse dimension.

Once the ions have passed through quadrupole mass analyzer 36, they are directed to ion analysis device 44 where the ions are analysed.

When quadrupole mass analyzer 36 is aligned in a vertical plane, a substantial saving in space (such as bench space or floor space) can be achieved. Such units are generally stored on a laboratory desk or bench top for ready operation. Accordingly, users of such equipment may benefit from the mass spectrometry arrangements of the present invention in that less storage space is required thereby providing more available working space. Therefore, it will be noted that the profile of housing 32 is much smaller than that for conventional mass spectrometer devices where the mass filter devices are arranged within the horizontal plane.

Furthermore, in such conventional devices, the ion source, the mass analyzer, and the mass detector are arranged in an in-line configuration resulting in an arrangement having a relatively significant dimension in the longitudinal direction (aligned within the horizontal plane). Accordingly, when such components are housed in an appropriate housing, the resulting footprint of such devices covers a significant amount of area (and volume) when supported upon a work surface such as a typical laboratory work bench.

In contrast, the arrangements of the mass spectrometer devices shown in the Figures each serve to reduce the resulting footprint of the respective devices when placed on a supporting work bench or similar. Therefore, by virtue of having the second intended path of travel 16B (ie. the path along which the ions pass through quadrupole mass analyzer 36 en route to the ion analysis device 44) being oriented in the vertical plane, the effective cross section of the housing in the horizontal plane can be reduced thereby minimizing the resulting footprint of the device (shown in FIGS. 5-8 placed on working surface 52).

In one aspect, and with specific reference to ion sources of an ICP configuration (an ion source known for increased signal sensitivity over other forms of mass spectrometry) in which the ion source must be orientated horizontally, the arrangements shown in the Figures exploit the advantage of ion guide 26 diverting the ion stream 22 from travelling within the horizontal plane to travelling within the vertical plane. This therefore allows the quadrupole mass analyzer 36 and associated components (arranged in-line with one another) to be aligned in the vertical plane thereby reducing the effective profile of the housing 32 in plane 35 (generally aligned substantially with the horizontal plane). For the arrangements shown, the distance traveled by ions along the first intended path of travel 16A is substantially smaller than the distance traveled by the ions along the second intended path of travel 16B.

Alternative embodiments are shown in FIGS. 1B and 1C which, for the most part, comprise similar arrangements to that shown in FIG. 1A. FIG. 1B shows a mass spectrometer 2B arranged to include a collisional cell 30 positioned between the ion guide 26 and the quadrupole mass analyzer 36. The ion stream 22 is therefore diverted by way of the ion guide 26 so as the ion stream enters the collisional cell 30 through aperture 33. As an alternative, FIG. 1C shows a mass spectrometer 2C in which the collisional cell 30 is positioned between the interface region 18 and the ion guide 26.

It will be readily appreciated by those skilled in the art that collisional cells 30 serve to filter interfering particles from the ion stream 22 thereby seeking to improve the signal strength of the ion stream at the ion analysis device 44. Any of the arrangements of the mass spectrometer described herein may include one or more collisional cells. The or each collisional cell 30 may be arranged so as to accommodate one or more reaction or collision gases such as ammonia, methane, oxygen, nitrogen, argon, neon, krypton, xenon, helium or hydrogen, or mixtures of any two or more of them, for reacting with ions extracted from the plasma. It will also be appreciated that the latter examples are by no means exhaustive and that many other gases, or combinations thereof, may be suitable for use in such collisional cells.

For all the embodiments of the present invention shown in FIGS. 1A to 1C, the ion source 12 is arranged so as to be positioned at the uppermost region of the arrangement above the ion analysis device 44, ie. so that the ion stream flows in the direction of gravity toward the ion analysis device 44 along the second intended path of travel 16B. The positioning of the ion source 12 and the ion analysis device 44 may be changed so that the ion source 12 is located below the ion analysis device 44. Such arrangements are reflected in each of the embodiments shown in FIGS. 2A through 2C. For example, FIG. 2A shows a mass spectrometer 4A in which the ion source 12 (aligned in a horizontal plane) is positioned lower most of the device and where the ion stream 22, once diverted by the ion guide 26, flows against gravity up toward the ion analysis device 44. Therefore, in this arrangement, the direction of the flow of ions along the second intended path of travel 16B is reversed. In having the ions flow against the direction of gravity, the inventors have found that the signal sensitivity is not compromised as compared with the arrangements shown in FIGS. 1A to 1C.

FIGS. 2B and 2C shows mass spectrometer arrangements 4B and 4C respectively, and which reflect corresponding arrangements shown in FIGS. 1B and 1C in which the collisional cell 30 is included.

FIGS. 3A and 3B shows mass spectrometer arrangements 6A and 6B respectively. For each of the arrangements shown, the ion guide 26 is incorporated within the quadrupole mass analyzer 36 in which the preliminary fringing rods 38 are provided as curved elements which serve to guide the ion stream 22 from the first intended path of travel 16A to the second intended path of travel 16B. For the case of mass spectrometer 6A, the ion optics lens 25 is positioned adjacent the entry into the quadrupole mass analyzer 36 and serves to ensure the ion stream 22 is extracted from the interface region 18. Having regard to the mass spectrometer 6B, a collisional cell 30 is positioned between the ion optics lens 25 and the entry to the quadrupole mass analyzer 36.

FIGS. 4A and 4B present mass spectrometer arrangements 8A and 8B respectively, each of which reflect the case where the ion source 12 is placed below the ion analysis device 44. As discussed in relation to the embodiments shown in FIGS. 2A through 2C, the direction of the ion stream 22 is reversed along the second intended path of travel 16B.

Figure 5:
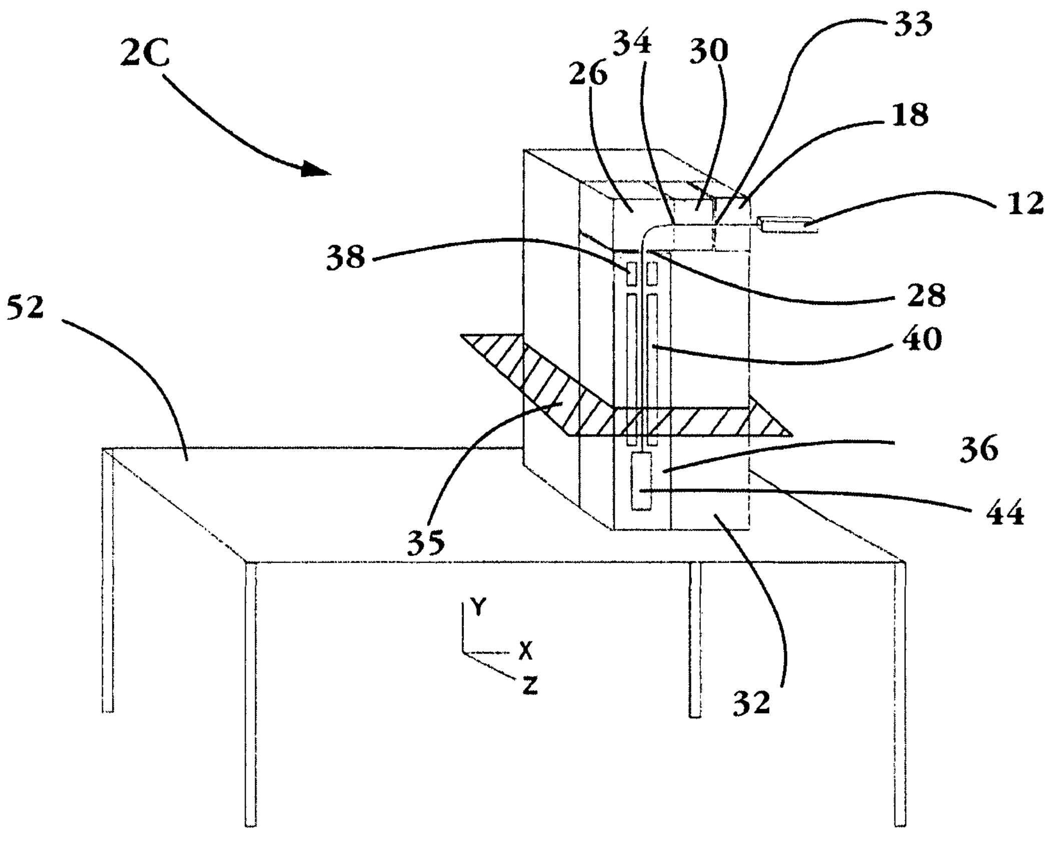
FIG. 5 shows a perspective view of the embodiment of the ICP-MS apparatus shown in FIG. 1C.
Figure 6:
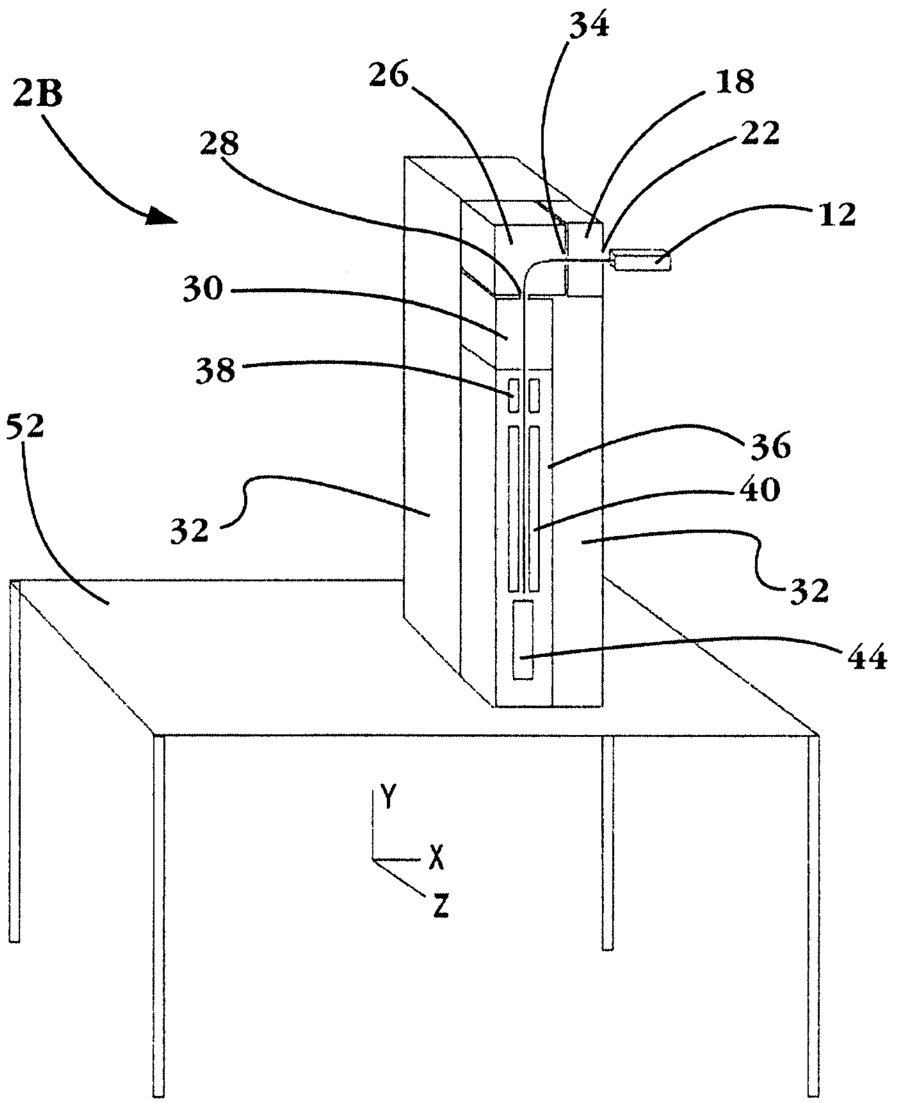
FIG. 6 shows a perspective view of the embodiment of the ICP-MS apparatus shown in FIG. 1B.
Figure 7:
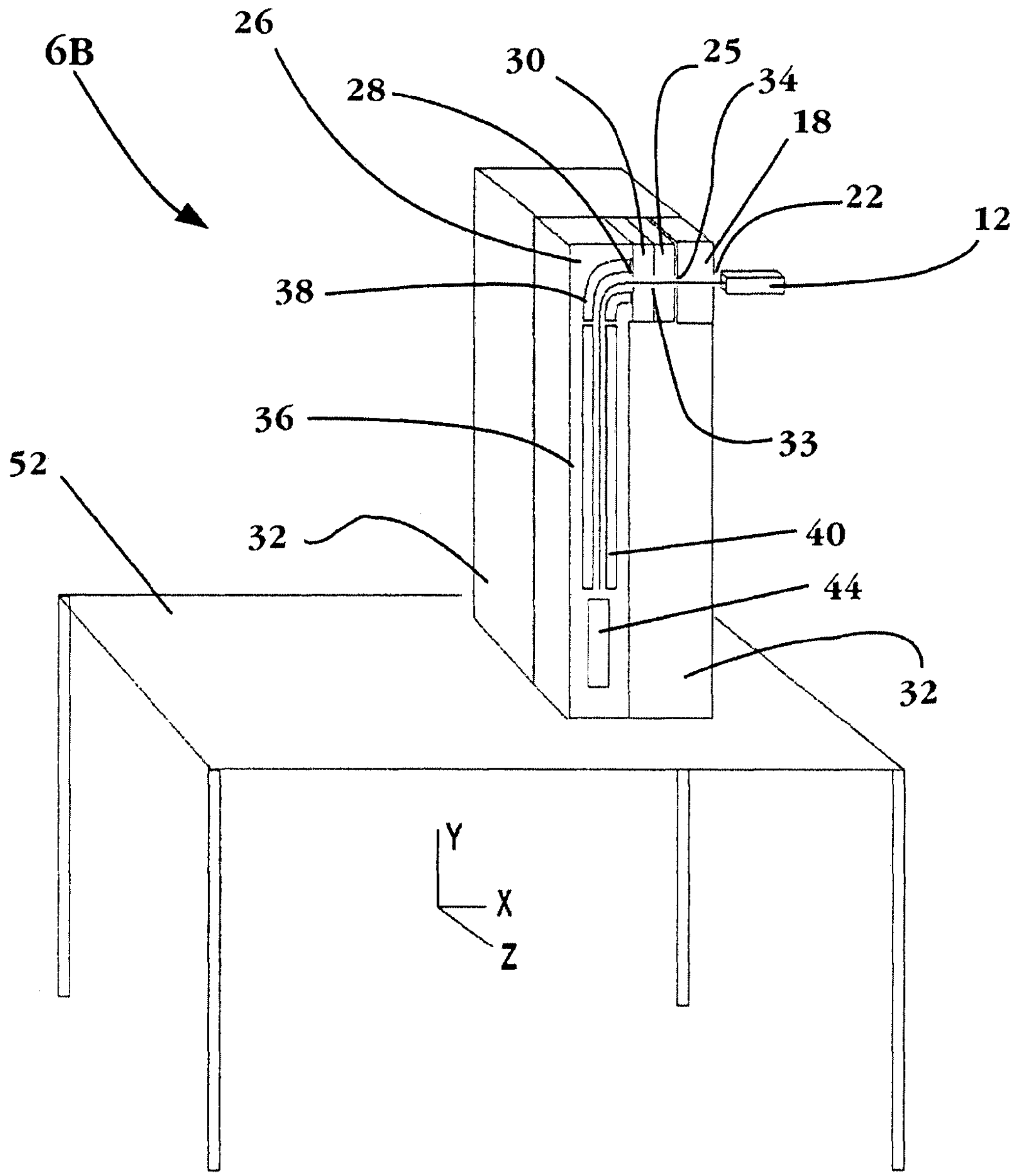
FIG. 7 shows a perspective view of the embodiment of the ICP-MS apparatus shown in FIG. 3B; and, FIG. 8 shows a schematic representation of the ICP-MS apparatus shown in FIG. 1C.

FIGS. 5 through 7 each show a perspective view of mass spectrometer 2C, 2B, 6B respectively, as each might appear as a commercial product. In each case, the mass spectrometer 2C is shown supported on surface 52 which is indicative of a typical work/bench top surface in a conventional laboratory environment. Accordingly, it is clear from FIGS. 5-7 that the respective footprints of the mass spectrometer arrangements shown are substantially smaller than conventional devices by way of the alignment of the quadrupole mass analyzer 36 and ion analysis device 44 arranged in the vertical plane.

Figure 8:
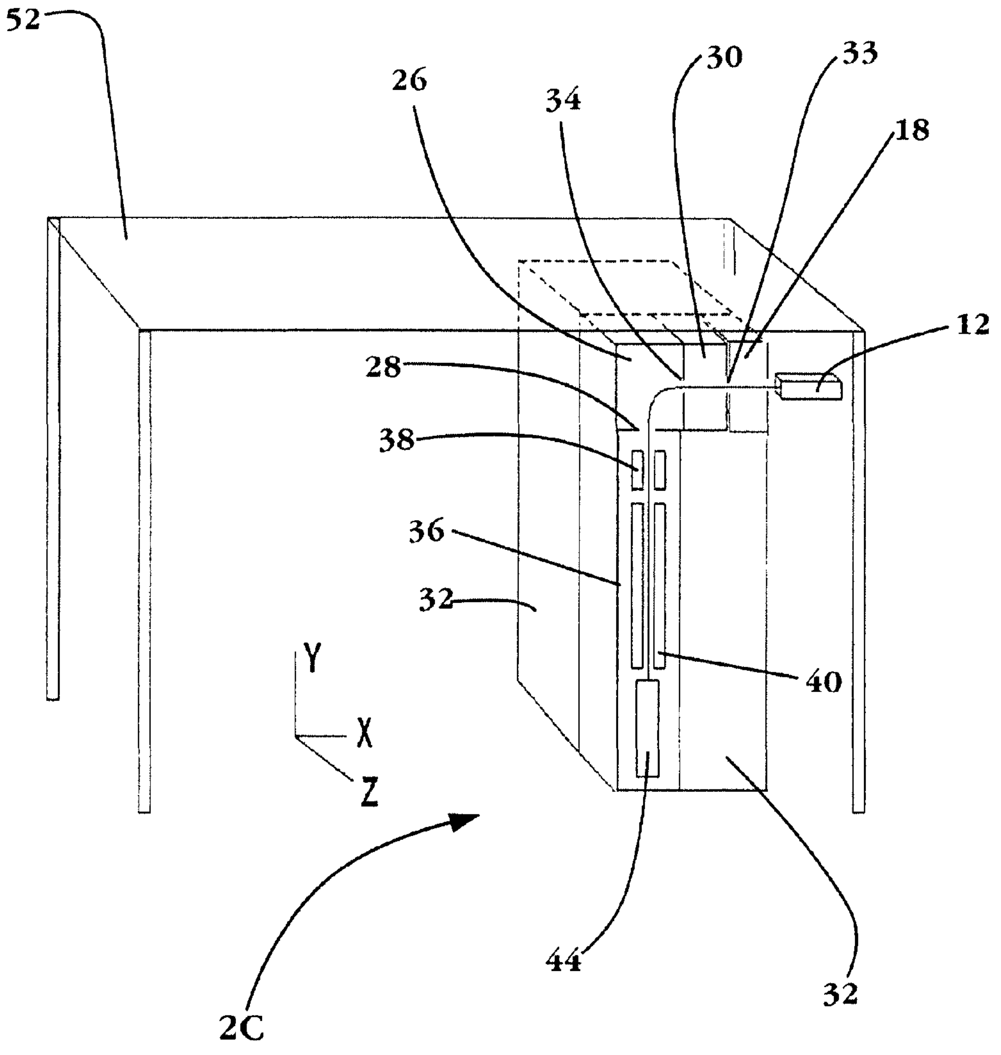

FIG. 8 shows a perspective view of mass spectrometer 2C (shown in FIG. 1C) as it might appear when positioned under a bench top surface—as is sometimes the case in laboratory environments. As again will be clearly evident from FIG. 8, the reduced profile of the device in the horizontal plane saves a significant amount of space regardless of where it might be positioned. Mass spectrometer 2C may be supported on the floor, or could be supported from underneath the bench using a supporting arrangement such as an appropriately configured harness assembly (arranged to ensure the device remains as still as possible to operate as required). It will be appreciated that many forms of supporting structure May be developed for supporting such devices in the manner shown.

For all embodiments shown in the Figures, the ion guide 26 comprises an ion optics arrangement capable of providing the required deflection of the ion beam between the horizontal and vertical planes. Such ion optics devices may include arrangements such as ion mirrors, reflectors, quadrupole ion deflectors, electrostatic energy analysers, magnetic ion optics, ion multiple guides and the like. It will be appreciated that the latter examples are not exhaustive but that any arrangement capable of deflecting a quantity of ions between two non-parallel planes may be employed with embodiments of the present invention. For example, the ion guide 26 may comprise an arrangement, or suitable variation thereof, of an ion optics 'Ion Mirror' device as employed in some ICP-MS mass spectrometry devices as described in U.S. Pat. No. 6,614,021 (incorporated herein by reference). Furthermore, having specific regard to ICP-MS, arrangements such as those described in the following U.S. patents may be arranged to work with embodiments of the present invention: U.S. Pat. No. 5,559,33, U.S. Pat. No. 5,773,823, U.S. Pat. No. 5,804, 821, U.S. Pat. No. 6,031,379, U.S. Pat. No. 6,815,667, U.S. Pat. No. 6,630,665, U.S. Pat. No. 6,6306,651.

The word 'comprising' and forms of the word 'comprising' as used in this description and in the claims does not limit the invention claimed to exclude any variants or additions. Modifications and improvements to the invention will be readily apparent to those skilled in the art. Such modifications and improvements are intended to be within the scope of this invention.

The claims defining the invention are as follows:

1. A mass spectrometry apparatus comprising:

an ion source arranged in a substantially horizontal orientation and from which a quantity of ions may be extracted and arranged to flow along a generally linear first path of travel that has a desired direction within a first plane substantially parallel with a horizontal plane;

an ion filter device arranged above the ion source for receiving a stream of ions for filtering thereof, said ions flowing along a generally linear second path of travel that is substantially parallel with a vertical plane in a direction substantially upwards relative to the vertical plane, so as to be received by an ion analysis device for spectrometry analysis; and, an ion guide arranged so as to guide ions sourced from the ion source along the first path of travel toward the ion filter device along the second path of travel;

wherein the distance traveled by ions along the first path of travel is significantly smaller than the distance traveled by ions along the second path of travel such that a profile of the apparatus is reduced so as to minimize the effective footprint of the apparatus.

2. A mass spectrometry apparatus according to claim 1, wherein the apparatus is arranged to divert or guide the ions from the first path of travel to flow along the second path of travel, the arrangement being such that the apparatus has a reduced footprint when supported on a typical supporting surface.

3. A mass spectrometry apparatus according to claim 1, wherein the ion guide comprises any arrangement capable of directing a beam or stream of ions between the first and second paths of travel.

4. A mass spectrometry apparatus according to claim 1, wherein the first and second planes are aligned so as to be substantially orthogonal to one another.

5. A mass spectrometry apparatus according to claim 1, wherein the ion filter device comprises a mass filter or mass analyzer arranged to receive a stream of ions from the ion guide for filtering purposes.

6. A mass spectrometry apparatus according to claim 5, wherein the mass analyzer is arranged to receive ions traveling along the second path of travel in the direction of the ion analysis device.

7. A mass spectrometry apparatus according to claim 1, wherein the ion filter device may comprise two or more pole elements.

8. A mass spectrometry apparatus according claim 7, wherein the mass analyzer is a quadrupole mass analyzer having four spaced apart but parallel metallic rods.

9. A mass spectrometry apparatus according to claim 1, wherein the ion filter device may be arranged so as to be aligned substantially parallel to a vertical plane, whereby a longitudinal axis of the ion filter device is arranged so as to be substantially parallel with a vertical plane.

10. A mass spectrometry apparatus according to claim 1, wherein the ion guide comprises an ion optics lens arrangement capable of directing the ion beam from the first path of travel to the second path of travel.

11. A mass spectrometry apparatus according to claim 1, wherein the ion guide comprises curved elements arranged so as to guide or direct the ion stream between the first and second paths of travel.

12. A mass spectrometry apparatus according to claim 11, wherein the curved elements are shaped in a manner that is commensurate with a portion or segment of the path of the ion stream.

13. A mass spectrometry apparatus according to claim 1, wherein the apparatus further comprises one or more collisional cells arranged for filtering interfering particles from the ion stream, thereby serving to improve the signal strength of the ion stream at the ion analysis device.

14. A mass spectrometry apparatus according to claim 13, wherein the or each collisional cell is arranged so as to accommodate one or more of the following reaction or collisional gases: ammonia, methane, oxygen, nitrogen, argon, neon, krypton, xenon, helium or hydrogen, or mixtures of any two or more of them, for reacting with ions extracted from the ion source.

15. A mass spectrometry apparatus according to claim 13, wherein the or each collisional cell is placed at any desired location along the first and or second paths of travel of the ion stream so as to remove unwanted particles from the ion stream.

16. A mass spectrometry apparatus according to claim 1, wherein the ion source may be provided by an inductively coupled plasma, whereby the inductively coupled plasma is arranged so as to be orientated in a substantially horizontal plane.

17. A mass spectrometry apparatus according to claim 1, wherein the first and second paths of travel are arranged relative to one another so that the profile of a housing in a plane substantially parallel with the first path of travel is reduced so as to minimize the effective footprint of the housing.

18. A mass spectrometry apparatus according to claim 1, wherein the first and second paths of travel are arranged relative to one another so that the profile of a housing in a plane substantially orthogonal to the second path of travel is reduced so as to minimize the effective footprint of the housing.

19. A mass spectrometry apparatus according to claim 1, wherein the ion source may comprise any known apparatus or device capable of providing ions for analysis.

20. A mass spectrometry apparatus according to claim 1, wherein the ion analysis device may include a mass spectrometry ion detector unit.

21. A mass spectrometry apparatus according to claim 1, wherein the apparatus is of the type of an inductively coupled plasma (ICP) mass spectrometer, whereby the ion source comprises an inductively coupled plasma which is aligned so that the first intended path of travel is aligned substantially with a horizontal plane.

22. An inductively coupled plasma mass spectrometry apparatus comprising:

an ion source from which a quantity of ions may be sourced for providing a stream of ions moving along a first path of travel that is aligned substantially with a horizontal plane;

an ion filter device arranged above the ion source and provided for receiving a stream of ions moving along a second path of travel for filtering the ion stream prior to analysis by an ion analysis device, the second path of travel being aligned substantially with a vertical plane whereby the stream of ions moving along the second path of travel moves in a direction substantially upwards relative to the vertical plane; and, an ion guide arranged so as to divert ions moving along the first path of travel to move along the second path of travel;

wherein the distance traveled by ions along the first path of travel is significantly smaller than the distance traveled by ions along the second path of travel thereby providing for the first and second paths of travel being arranged relative to one another so that the profile of the apparatus in a plane aligned substantially orthogonal to the second path of travel is reduced so as to minimize the effective footprint of the apparatus.

23. An inductively coupled plasma mass spectrometry apparatus according to claim 22, wherein the ion guide is an ion mirror.

24. An inductively coupled plasma mass spectrometry apparatus according to claim 22, wherein the ion filter device is a quadrupole mass analyzer.

25. An inductively coupled plasma mass spectrometry apparatus according to claim 22, wherein the apparatus further comprises a collisional cell positioned intermediate of the ion guide and the ion filter device.

26. An inductively coupled plasma mass spectrometry apparatus comprising:

an ion source from which a quantity of ions may be sourced for providing a stream of ions moving along a first path of travel aligned substantially with a horizontal plane;

a quadrupole mass analyzer for receiving a stream of ions moving along a second path of travel for filtering the ion stream prior to analysis by an ion analysis device, the second path of travel being aligned substantially with a vertical plane and the stream of ions moving therealong arranged to move in a direction substantially upwards relative to the vertical plane;

an ion mirror arranged so as to divert ions moving along the first path of travel to move along the second path of travel; and, a collisional cell positioned intermediate of the ion mirror and the quadrupole mass analyzer; and, wherein the distance traveled by ions along the first path of travel is significantly smaller than the distance traveled by ions along the second path of travel thereby providing for the first and second paths of travel being arranged relative to one another so that the profile of the apparatus in a plane aligned substantially orthogonal to the second path of travel is reduced so as to minimize the effective footprint of the apparatus.

* * * * *